(12) United States Patent
Nash et al.

(10) Patent No.: US 12,450,215 B1
(45) Date of Patent: Oct. 21, 2025

(54) SCALABLE KEY VALUE STORAGE IN A DISTRIBUTED STORAGE SYSTEM

(71) Applicant: CrowdStrike, Inc., Sunnyvale, CA (US)

(72) Inventors: Brent Ryan Nash, Ladera Ranch, CA (US); Timothy Jason Berger, Eastvale, CA (US); Sean Berry, Mission Viejo, CA (US); Audumbar Chormale, Santa Clara, CA (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/677,777

(22) Filed: May 29, 2024

(51) Int. Cl.
*G06F 16/00* (2019.01)
*G06F 16/22* (2019.01)

(52) U.S. Cl.
CPC ................... *G06F 16/22* (2019.01)

(58) Field of Classification Search
CPC ........................................................ G06F 16/22
See application file for complete search history.

(56) References Cited

U.S. PATENT DOCUMENTS

| | | | |
|---|---|---|---|
| 11,468,011 B2 | 10/2022 | Birka et al. | |
| 2008/0005199 A1* | 1/2008 | Chen | H04L 67/1095 |
| 2010/0077489 A1* | 3/2010 | Ake | G06F 21/6245 |
| | | | 726/30 |
| 2012/0265762 A1* | 10/2012 | Wade | G06V 30/224 |
| | | | 707/741 |
| 2015/0120661 A1* | 4/2015 | Keebler | G06F 16/27 |
| | | | 707/627 |
| 2018/0121496 A1* | 5/2018 | Hayes | G06F 40/40 |
| 2024/0192967 A1* | 6/2024 | Keshavamurthy | |
| | | | G06F 9/44521 |

FOREIGN PATENT DOCUMENTS

| | | | | |
|---|---|---|---|---|
| CN | 112100179 A | * | 12/2020 | ......... G06F 16/2228 |
| CN | 114253980 A | | 3/2022 | |
| JP | 2016519810 A | | 10/2018 | |

OTHER PUBLICATIONS

Hart, Josh, "Large object storage strategies for Amazon DynamoDB," available at <<https://aws.amazon.com/blogs/database/large-object-storage-strategies-for-amazon-dynamodb/>>, Jun. 21, 2022, 10 pages.

(Continued)

*Primary Examiner* — Dinku W Gebresenbet
(74) *Attorney, Agent, or Firm* — Lee & Hayes, P.C.

(57) ABSTRACT

Techniques for implementing a scalable key value storage in a distributed storage separate the storage of the collection of data objects from the storage of the index corresponding to the collection. According to an implementation, a database service may receive a request to create a collection of data objects in an object storage. A schema may be specified for the collection. The database service may generate a unique identifier (ID) corresponding to the collection and create the collection in the object storage. The objects in the collection and the associated schema may be further written to an object table and a schema table, respectively. The database service may further validate the schema and extract one or more indexable fields from the schema. The database service may send a request to a database search service to create an index for the collection in an index storage.

17 Claims, 11 Drawing Sheets

(56) References Cited

OTHER PUBLICATIONS

Mongodb, "Schema Validation," available at <<https://www.mongodb.com/docs/manual/core/schema-validation/>>, 2024, 4 pages.
Saley, et al., "Building Faster Indexing with Apache Kafka and Elasticsearch," available at <<https://doordash.engineering/2021/07/14/open-source-search-indexing/>>, Jul. 14, 2021, 12 pages.

* cited by examiner

SCALABLE KEY VALUE STORAGE IN A DISTRIBUTED STORAGE SYSTEM

BACKGROUND

In today's fast-paced digital environment, data management and retrieval have become paramount for businesses seeking to remain competitive. Among the diverse range of available database management systems, key value store databases have emerged as a crucial tool for optimizing efficiency and speed in handling vast amounts of data. Each data entry in a key value store is a key-value pair, where the key acts as an identifier and the value can be any type of data, from strings and numbers to more complex structures like JSON objects or binary data. Key value stores shine in scenarios requiring ultra-fast data retrieval. Their simplicity and direct key-to-value mapping make them a go-to-choice for applications that demand low-latency responses. As data grows, key value stores can scale horizontally, distributing data across multiple nodes or clusters. This ensures consistent performance even as workloads increase.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
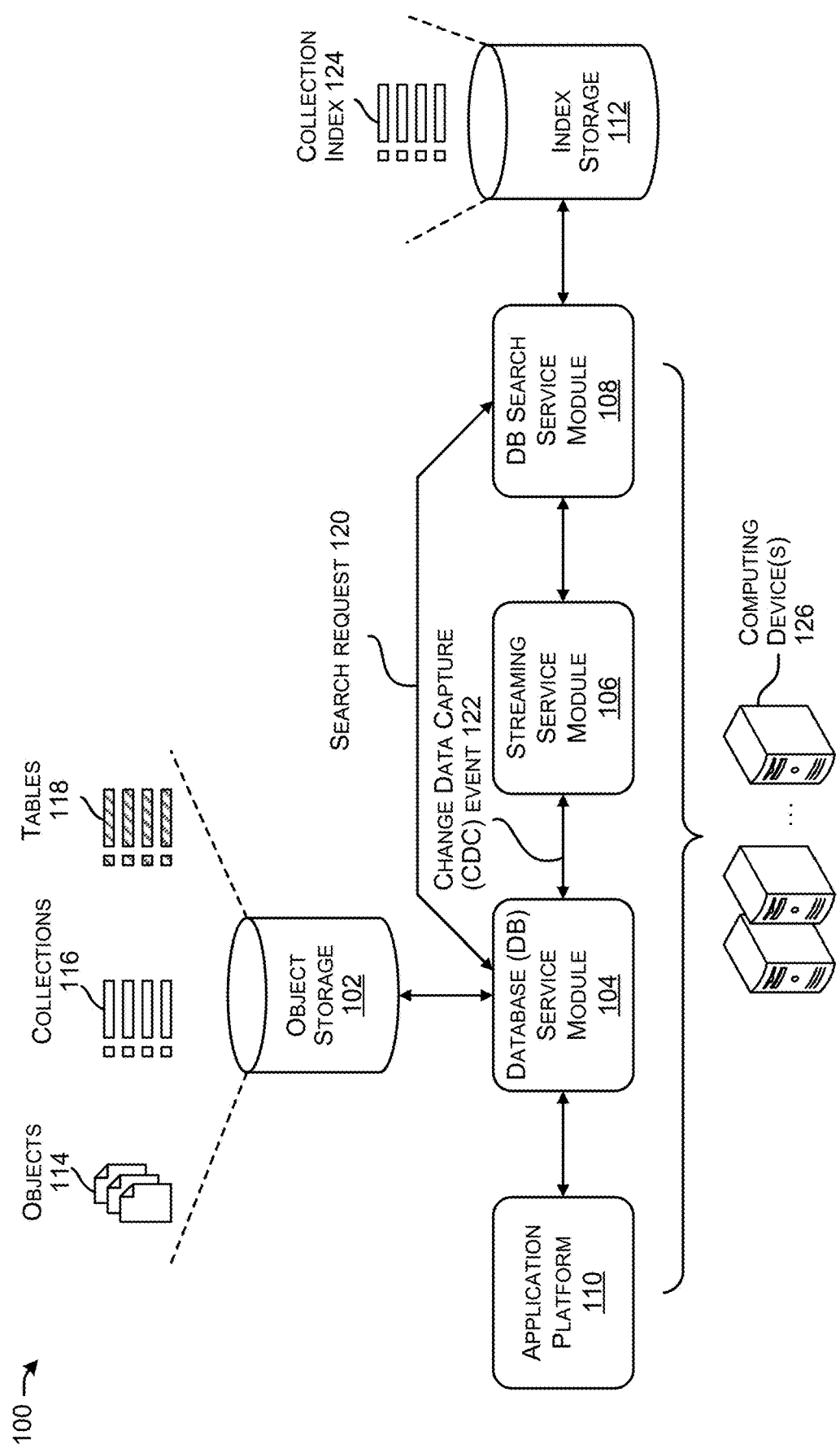
FIG. 1 illustrates an example scenario 100, in which, a scalable key value storage in a distributed storage system is implemented, according to an example of the present disclosure.

As key value store databases prioritize speed over complex querying, performing advanced queries or aggregations might be challenging. Some key value stores prioritize availability and partition tolerance over strong consistency, which might lead to data inconsistencies in certain scenarios. As the data traffic in the network continues to grow, a storage solution that has the flexibility to store data of any size, supports query language-based search, and can be scaled horizontally indefinitely is desired.

Techniques for implementing a scalable key value storage in a distributed storage system are disclosed herein.

According to an aspect of the present disclosure, a method for scalable key value storage may be implemented on a computing device configured to provide services to data storage in a distributed storage system. The computing device (e.g., a database service) may receive, from an application platform, a request to create a collection of data objects in an object storage. The request may include a namespace such as an application ID and a digital file that describes attributes of the objects in the collection. In some examples, the digital file may be a schema specified for the collection. The attribute may indicate whether one or more fields of the objects are indexable or searchable. In some examples, the schema may be specified in various formats such as JSON schema, XSD, CSV schema, etc. The database service may generate a unique identifier (ID) corresponding to the collection of data objects and create the collection of data objects in the object storage according to the schema and the unique ID of the collection.

In implementations, the database service may further determine whether the attributes associated with the collection satisfy a criteria. When the attributes associated with the collection satisfy a criteria, the database service may send a request to a second computing device (e.g., a database search service) to create an index for the collection in an index storage. The attributes associated with the collection may be described in the schema to indicate one or more fields associated with the objects. The database service may determine whether the one or more fields are searchable or indexable. When one or more fields are searchable or indexable, the database search service may create an index in the index storage based on the attributes.

In implementations, the request to create an index for the collection may include the unique ID of the collection, a version of the schema, one or more searchable fields, etc. The database service may directly call the database search service via a Remote Procedure Call API such as gPRC API to send the request to create the index for the collection.

In implementations, the database service may create an entry corresponding to the schema in a schema table in the object storage and store metadata associated with the schema in the object storage. In some examples, the metadata associated with the schema may include but is not limited to, a format of the schema, a type of the schema, a version of the schema, etc. The entry corresponding to the schema may indicate the unique ID of the collection that the schema is attached to.

In implementations, the database service may execute a hash function to compute partition assignment for each object in the collection and determine a storage pod to write each object to. The database service may further generate a storage partition mapping for the objects in the collection using consistent hashing techniques. In some examples, the storage partition mapping may be depicted as a collection hash ring. A partition that an object is mapped to may further point to the closest partition that indicates a storage pod to store the object itself and a storage pod to store its associated index.

In implementations, the database service may receive a request to add a new data object to the collection of data objects. The request may include a second digital file (e.g., second schema). Alternatively, the database service may receive the request to add the new data object to the collection and a separate request to add a second digital file (e.g., second schema) to the collection. The database service may validate whether the second digital file is in a valid format such as JSON schema. If the second digital file is validated, the database service may add the new data object to the collection of data objects. That is, the second schema may stay in a "DRAFT" state until it is validated and turns to a "PUBLISHED" state. In some examples, the second schema may be a new version of the first schema associated with the collection. The database service may determine the version of the second digital file based on the associated timestamp. The database service may further pass the indexable fields indicated in the second schema along with the new version of the schema and the unique ID of the collection to a streaming system such as Kafka topic. A downstream service such as the database search service may batch the incoming events from the streaming system and insert the indexable fields into the index table in a scalable manner. In some examples, the database search service may further associate all versions of the schema with the unique ID of the collection.

In implementations, for large objects over a certain configurable threshold, the database service may write a small pointer entry into the object storage and store the actual object data in a large capacity storage such as Amazon S3 or MinIO. In some examples, the configurable threshold for large objects may be set as 256 KB.

In some examples, a captured data change (CDC) event may be captured by the database service upon performing an operation in the object storage. In another example, a database tail service may periodically poll the object storage to find the CDC records in a period of time. The database tail service may batch send the CDC records in the period of time to a streaming platform to be consumed by downstream consumers. In some other examples, the object storage may implement a CDC agent that automatically detects and emits the CDC records to the streaming platform. A downstream consumer such as the database search service, may use the CDC records to update the index storage according to the changes in the object storage.

The present disclosure designs a scalable key value storage in a distributed storage system. According to the present disclosure, a collection of objects and its associated indexes are stored separately in different storage pods. Changes of the objects in a collection may automatically generate data change records, which are further streamed in order to downstream customers. The database search service, as a downstream customer, may update the index associated with the collection accordingly. As discussed herein, a separation of storage from search may allow both the storage (e.g., object storage vs. index storage) and the services themselves (e.g., database service vs. database search service) to scale independently. Additionally, to store large objects in a large capacity storage such as Amazon S3 or MinIO while writing a small pointer entry into the object storage may facilitate to achieving a virtually unlimited object size yet keeping fetches for smaller values fast.

Example implementations are provided below with reference to the following figures.

FIG. 1 illustrates an example scenario 100, in which, a scalable key value storage in a distributed storage system is implemented, according to an example of the present disclosure.

As illustrated, the example scenario 100 may include an object storage 102 configured to store data objects 114, collections 116, tables 118 including posting list tables, metadata associated with the data objects and collections such as schemas etc. A database (DB) service module 104 may perform various operations on the object storage 102 upon receiving a request from an application platform 110. For example, the application platform 110 may call application program interfaces (APIs) to send a request for the DB service module 104 to create/read/update/delete a data object in the object storage 102. In some other examples, the application platform 110 may call APIs to send a request for the DB service module 104 to create/describe/drop/list/update a collection in the object storage 102. In yet other examples, the application platform 110 may call APIs to send a request for the DB service module 104 to delete/get/list/publish/put schemas on a collection in the object storage 102. In yet other examples, the application platform 110 may call APIs to send a request for the DB service module 104 to delete/get/list/put/search an object in the object storage 102.

In some examples, the DB service module 104 may receive, at a CreateCollection API, a namespace (e.g., an Application ID), a name, a schema, and a schema type, from the application platform 110. The DB service module 104 may retrieve a lock/release status on the collection and verify that the collection does not already exist in the object storage 102. Upon verifying that the collection does not already exist in the object storage 102, the DB service module 104 may create a new unique ID for the collection and insert the collection details into the collections 116 (also referred to as a collection table). The DB service module 104 may further insert the schema details into tables 118 (e.g., a schema table of the tables 118). Once the collection is created, the DB service module 104 may release the lock/release status on the collection.

In some examples, a schema may be specified for a collection at the time of collection creation so that the collection is searchable. In implementations, the DB service module 104 may call an API to create a collection of objects. The DB service module 104 may call another API to create a schema for the collection, where the schema describes attributes associated with the objects in the collection. When a collection is created, if the collection references a schema, an associated search index may be created for the collection in an index storage 112. In some examples, after the new collection is created, but before the new collection schema is created, the DB service module 104 may parse and validate the schema and extract all searchable fields defined by the schema. The DB service module 104 may make an API call to the database (DB) search service module 108 to create a new index in the index storage 112 for the new collection. In some examples, DB service module 104 may contact the DB search service module 108 via a Remote Procedure Call API such as gPRC API.

In implementations, the schema may be specified in various formats such as JSON schema, XSD, CSV schema, etc. Taking JSON schema as an example, a user may label the searchable fields in the JSON schema as "indexable." In another example, the user may provide, through the application platform 110, separate parameters to the CreateCollection API to specify a list of searchable fields (e.g., in JSONPointer format). In yet another example, the user may provide a list at a top level of the JSON schema file to specify all the searchable fields. In yet another example, the user may provide a custom attribute in the JSON schema file for each searchable field to mark it as "should be searchable." In yet other examples, the fields marked "required" in the JSON schema file may be transparently treated as searchable.

In some examples, a searchable field specified in the schema of a collection of data objects may correspond to a key associated with the collection of data objects. Although the collection of data objects may include multiple keys, only these keys that are specified as searchable in the schema may be stored in the index storage 112. In implementations, the unique ID created for the new collection and a version of the schema may be stored together with these searchable keys in the index storage 112. As illustrated, collection index 124 stored in the index storage 112 may include index data corresponding to all the collections stored in the object storage 102 (e.g., collections 116).

In some examples, the DB service module 104 may receive a search request from the application platform 110. The search request may indicate one or more search fields. The DB service module 104 may send a search request 120 along with the one or more search fields to the DB search service module 108. The DB search service module 108 may then identify indexed data associated with one or more objects in the index storage 112, where the one or more objects are indexed based on the one or more search fields. The DB search service module 108 may provide the indexed data associated with the one or more objects to the DB service module 104. Based on the index data, the DB service module 104 may obtain details of the one or more objects and/or collections from the object storage 102 and send the search result to the application platform 110. In some examples, the DB service module 104 may send the search request 120 to the DB search service module 108 directly in a Remote Procedure Call API such as gPRC API.

In implementations, any operation on the object storage 102 may result in a change data capture (CDC) event 122. The operation may be related to an object, a collection, and/or a schema associated with an object and/or a collection. The CDC event 122 triggered by any changes to an object, a collection, and/or a schema may be automatically egressed to the streaming service module 106 to a downstream consumer. The DB search service module 108, as an example of the downstream consumer, may receive the CDC event 122 and update the index storage 112 accordingly. In some examples, the CDC event 122 may be triggered by creating, describing, dropping, listing, or updating a collection in the object storage 102. In some other examples, the CDC event 122 may be triggered by deleting, getting, listing, publishing, or putting a schema on a collection in the object storage 102. In yet other examples, the CDC event 122 may be triggered by deleting, getting, listing, putting, or searching an object in the object storage 102.

In some examples, the application platform 110, the DB service module 104, the streaming service module 106, and the DB search service module 108 may be implemented by one or more computing device(s) 126. In some examples, the object storage 102 may be communicatively connected to the computing device that implements the database service module 104 locally or via a network. The index storage 112 may be communicatively connected to the computing device that implements the DB search service module 108 locally or via a network.

It should be appreciated that the example scenario 100 is merely for the illustration purpose. In some examples, each of the DB service module 104, the streaming service module 106, and the DB search service module 108 may be implemented by an individual computing device. In some other examples, the DB service module 104, the streaming service module 106, and the DB search service module 108 may be integrated and implemented by a single computing device. The object storage 102 and the index storage 112 may each include multiple clusters and storage pods. Additionally, the streaming service module 106 may be also coupled to a storage (not shown) that includes multiple clusters and storage pods to stream the CDC event 122 from the DB service module 104.

Figure 2:
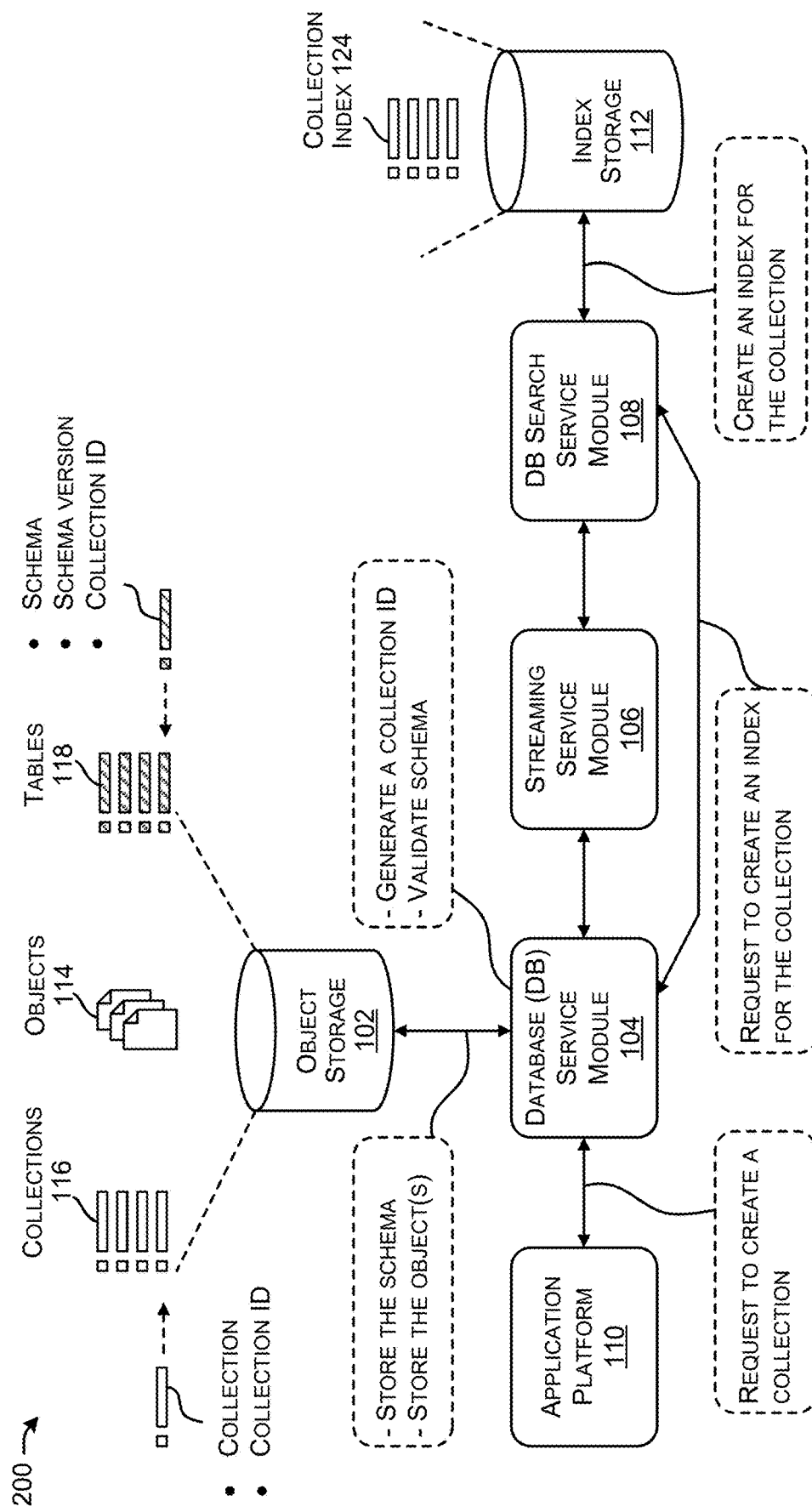
FIG. 2 illustrates an example scenario, in which, an operation to create a new collection is performed in the scalable key value storage in a distributed storage system, according to an example of the present disclosure.

FIG. 2 illustrates an example scenario, in which, an operation to create a new collection is performed in the scalable key value storage in a distributed storage system, according to an example of the present disclosure.

As shown in the scenario 200, the application platform 110 may send a request to create a collection to the DB service module 104. The request to create a collection may indicate an application ID (e.g., namespace), a name of the collection, schema specified for the collection, a version of the schema, etc. As discussed herein, the schema may describe settings related to how objects in the collection are to be stored in the object storage 102. For instance, the schema may label one or more keys associated with the objects in the collection as searchable fields. Upon receiving the request to create a collection, the DB service module 104 may generate a collection ID for the collection. The collection ID may be a universal unique identifier (UUID) used to uniquely identify the collection. The DB service module 104 may further validate whether the schema is compatible with the specification used by the object storage 102, for instance, whether the schema is a valid JSON schema according to the specification. Once the schema is validated, the DB service module 104 may parse the schema, extract the indexable fields, and validate that the fields labeled as indexable are actually supported by the index storage 112. In some examples, an indexable field may be extracted as a pointer-type pair. If the index storage 112 does not support indexing of an array that contains different types, the array is not to be indexed even through the array is marked as indexable.

As discussed herein, the DB service module 104 may perform the operations of validating and parsing the schema before inserting any data (e.g., objects, collections, schema, metadata, etc.) into the object storage 102. As such, all collections stored in the object storage 102 are associated with valid schemas and can be efficiently identified using the searchable indexes stored in the index storage 112.

Once the schema is validated and the indexable fields are extracted, the DB service module 104 may send a request to the DB search service module 108 to create an index for the collection in the index storage 112, and at the meantime, perform operations in the object storage 102 such as putting the objects in the collection, inserting collection details into a collection table, inserting schema details into a schema table, etc. The collections may be inserted to the collection table with a collection ID. In some examples, the schema of the collection may be saved along with a collection ID and a version of the schema. In some examples, the DB service module 104 may call the DB search service module 108 directly in a Remote Procedure Call API such as gPRC API to send the request to create a new collection.

Figure 3:
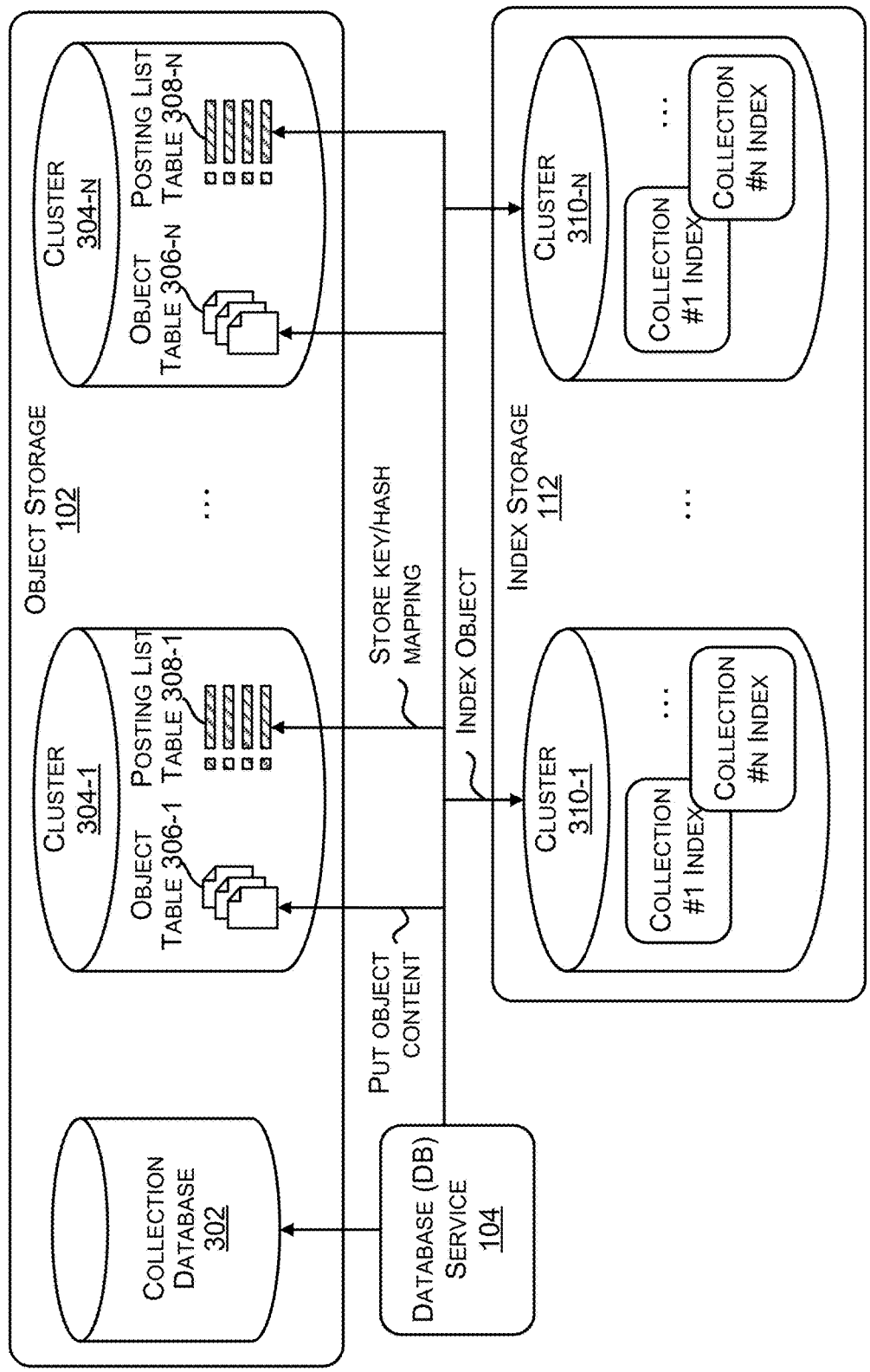
FIG. 3 illustrates an example architecture of the scalable key value storage in a distributed storage system, according to an example of the present disclosure.

FIG. 3 illustrates an example architecture of the scalable key value storage in a distributed storage system, according to an example of the present disclosure.

As illustrated in the example architecture 300, the object storage 102 may include a collection database 302 for storing data associated with collections, and a plurality of clusters, e.g., cluster 304-1, . . . , cluster 304-N (hereinafter referred to as cluster 304), for storing different types of tables that describe how the objects in a collection are stored and related. The collection database 302 may be configured to store data associated with the collections of objects including but is not limited to, application ID associated with the collection, a name or a description of the collection, names of the objects in the collection, an ID or a UUID of the collection, a schema associated with the collection, a version of the schema, etc. In some examples, data stored in the collection database 302 may be persisted. The different types of tables stored in the plurality of clusters may include object tables, e.g., object tables 306-1, . . . , 306-N (hereinafter referred to as object table 306) that store the objects and associated metadata, and posting list tables, e.g., posting list tables 308-1, . . . , 308-N (hereinafter referred to as posting list table 308) that store the key and hash mappings for the objects in a collection.

In some examples, the index storage 112 may also include a plurality of clusters, e.g., cluster 310-1, . . . , cluster 310-N (hereinafter referred to as cluster 310). Each of the plurality of clusters may store index data for a given collection. As illustrated, cluster 310-1 may store index data for collection #1, . . . , and cluster 310-N may store index data for collection #N. In some examples, the index data for a particular collection may include the collection ID (e.g., UUID), the version of the associated schema, one or more searchable fields or keys, etc.

As discussed herein, once the schema associated with a collection is validated, the DB service module 104 may put the object in a collection in one cluster of object storage 102. The DB service module 104 may further index the objects in the clusters of the index storage 112. The index data of the objects in a collection may be stored in one cluster of the index storage 112. In implementations, the object storage 102 and the index storage 112 may be part of an overall data storage. Although the clusters in the object storage (e.g., 304-1, . . . , cluster 304-N) and the clusters in the index storage (e.g., cluster 310-1, . . . , cluster 310-N) are shown as separate elements, a given collection, associated schema, and its corresponding index data may be stored in a same cluster.

It should be understood that the example architecture 300 is for the purpose of illustration. The present disclosure is not intended to be limiting. In some example, each cluster of the object storage 102 and the index storage 112 may include multiple nodes to achieve fault tolerance. The object storage 102 and/or the index storage 112 may further store metadata associated with the collections, objects, schemas, and/or indexes. Further, although shown as separate storages, the object storage 102 and the index storage 112 may be implemented by one storage having multiple clusters, nodes, and/or pods.

Figure 4:
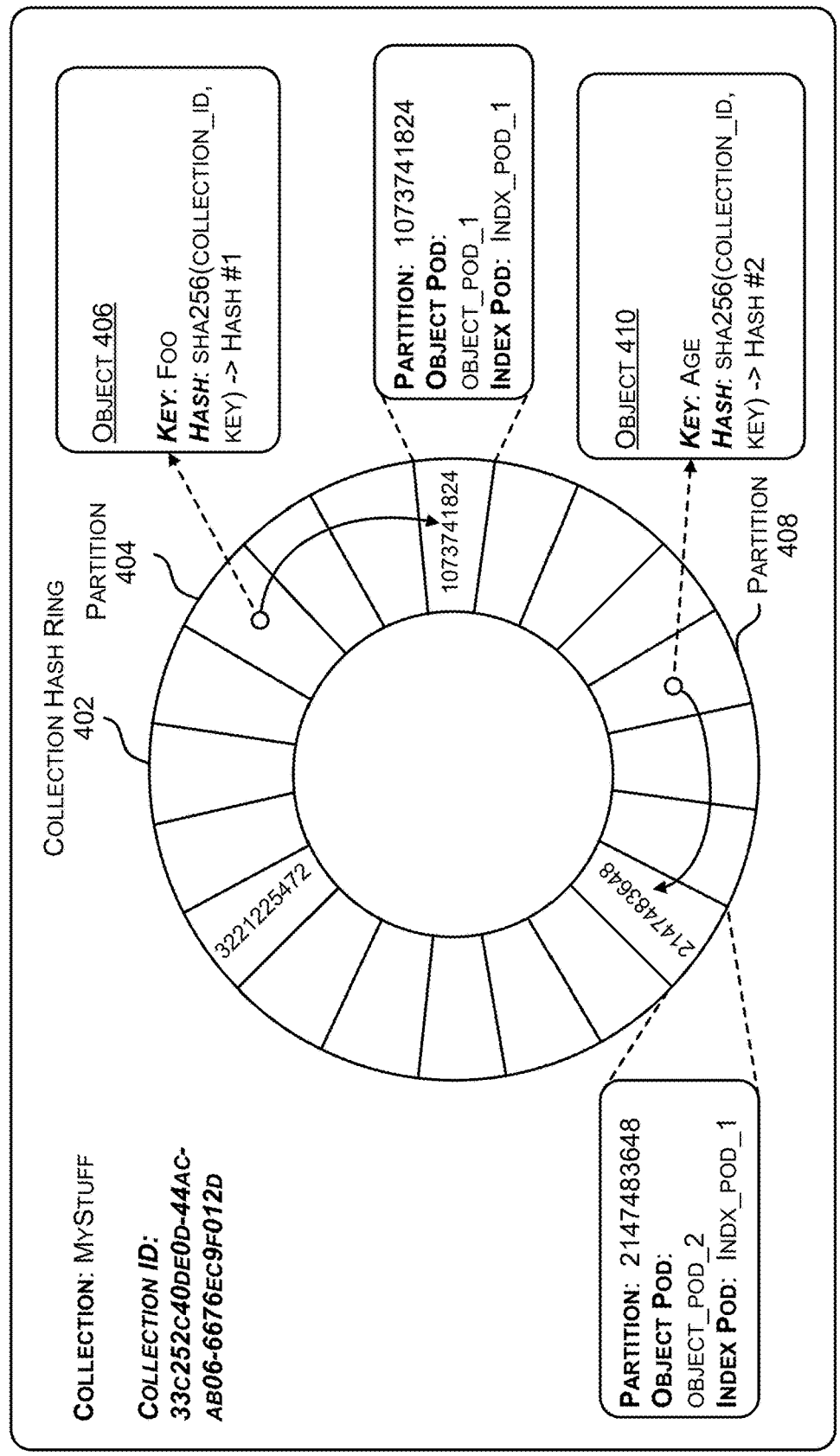
FIG. 4 illustrate an example key and hash mapping diagram for a collection, according to an example of the present disclosure.

FIG. 4 illustrate an example key and hash mapping diagram for a collection, according to an example of the present disclosure.

As illustrated, the example key and hash mapping diagram 400 may be constructed as a collection hash ring 402 using consistent hashing techniques. An object in a collection may be mapped onto a partition of the collection hash ring 402. A computed hash of the object may further point to another partition on the collection hash ring 402 that maintains identity information of an object pod where the object is stored and identity information of an index pod where the key-value pair of the object is indexed. The identity information of the object pod or the identity information of the index pod may include an ID of the object pod or the index pod, an IP address of the object pod or the index pod, a name of the object pod and/or the index pod, etc.

For example, the collection hash ring 402 may be constructed for a collection named "MyStuff" with a collection ID "33c252c40de0d-44ac-ab06-6676ec9f012d." A partition 404 on the collection hash ring 402 may be assigned to object 406 of the collection "MyStuff." As shown, a key of "Foo" may be associated with the object 406. The collection ID "33c252c40de0d-44ac-ab06-6676ec9f012d" and the key "Foo" of the object may be further converted to a hash value (e.g., Hash #1) using SHA256 hash function. The hash value (e.g., Hash #1) computed for object 406 may further point to partition "1073741824" on the collection hash ring 402. As shown, the partition "1073741824" may include information such as "Object_Pod_1" indicating where object 406 is stored and "Index_Pod_1" indicating where the key-value pair for "Foo" is indexed. As discussed herein, the partition "1073741824" may be the closest partition to the partition 404 on the collection hash ring 402 that indicates the storage information of the object 406.

As another example, a partition 408 on the collection hash ring 402 may be assigned to object 410 of the collection "MyStuff." A key of "Age" may be associated with the object 410. The collection ID "33c252c40de0d-44ac-ab06-6676ec9f012d" and the key "Age" of the object may be further converted to a hash value (e.g., Hash #2) using SHA256 hash function. The hash value (e.g., Hash #2) computed for object 410 may further point to partition "2147483648." As shown, the partition "2147483648" on the collection hash ring 402 may include information such as "Object_Pod_2" indicating where object 410 is stored and "Index_Pod_2" indicating where the key-value pair for "Age" is indexed. Similarly, the partition "2147483648" may be the closest partition to the partition 408 on the collection hash ring 402 that indicates the storage information of the object 410.

Although not shown, each partition in the collection hash ring 402 may further include information of the storage pod where the object resides, e.g., a name of the pod, an ID of the pod, an IP address of the pod, etc. Alternatively or additionally, each partition in the collection hash ring 402 may further include information of the storage pod where the index resides, e.g., a name of the pod, an ID of the pod, an IP address of the pod, etc. As discussed herein, a single hash ring may be constructed for a collection. Alternatively or additionally, a single has ring may also be mapped to more than one collection. As discussed herein, the collection hash ring 402 may be a virtual ring that illustrates an association between each object in a collection and its key-value storage medium. The partition on the virtual ring that indicates the storages (e.g., the storage pod) that stores the object and key-value pair may be closest to the partition that maps to the object on the virtual ring, in a clockwise direction or a counterclockwise direction.

In some examples, the objects and the associated key-value pairs in a collection may be stored in separate pods of a single cluster. When a new object is added to the collection, a DB service module (e.g., the DB service module 104) may assign a partition on the collection hash ring to the new object and compute a hash value for the new object. The hash value of the new object may further point to a closest partition on the hash ring in a clockwise or a counterclockwise direction, where the closest partition indicates a storage pod in the cluster that stores the objects and a separate storage pod in the cluster that stores the associated key-value pair. In some circumstances, a storage pod in the cluster may be removed. An object that maps to a partition on the hash ring that indicates an object and/or index storage in the storage pod may be rehashed using a hash function. The recomputed hash value of the object may point to another partition on the hash ring in a clockwise or a counterclockwise direction, where the another partition indicates new storage pod information to store the object and/or the associated key-value pair, e.g., IP addresses of the new pods, IDs of the new pods, and/or names of the new pods.

Figure 5:
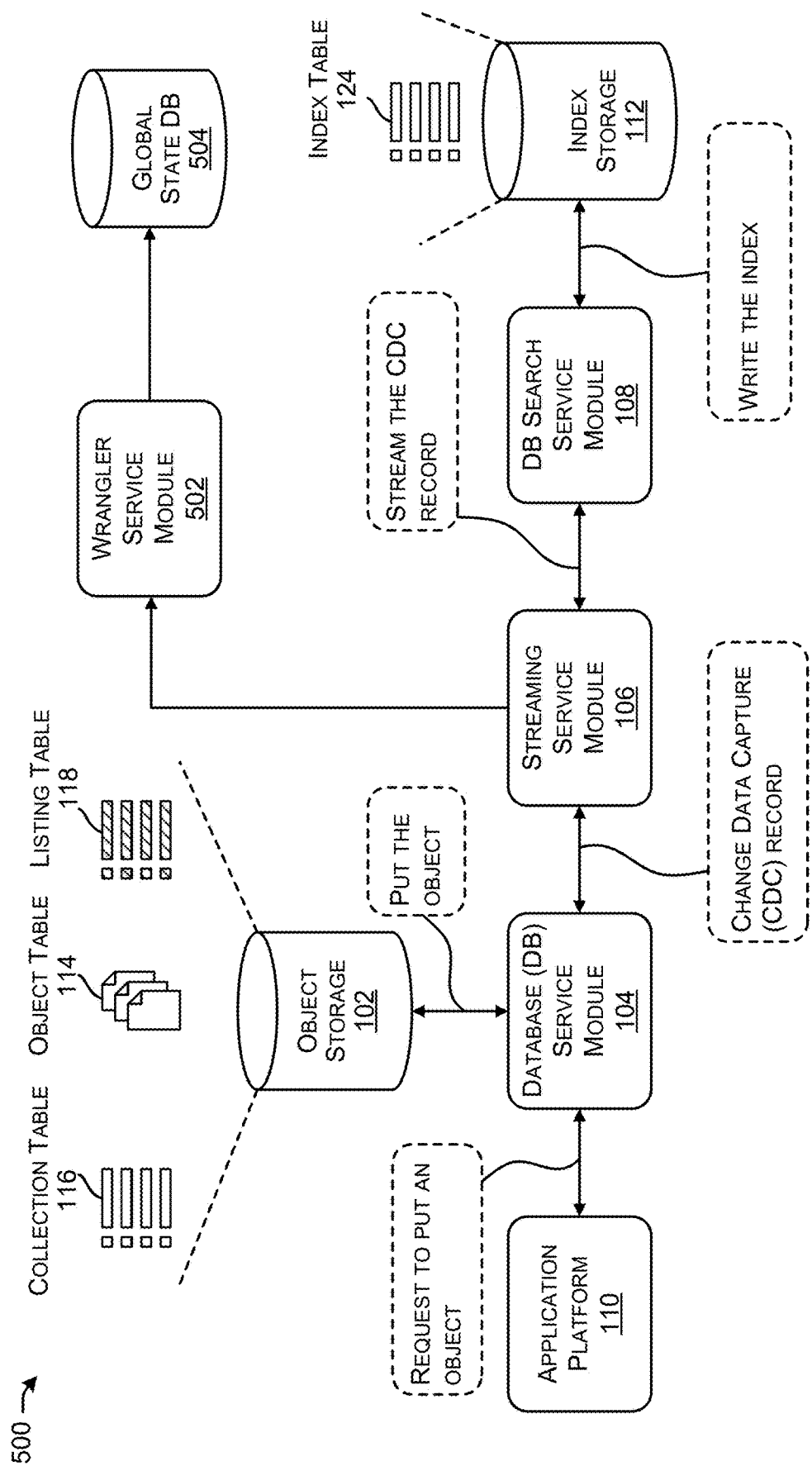
FIG. 5 illustrates an example scenario, in which, an object storage change stream is captured and delivered to consumers in a distributed storage system, according to an example of the present disclosure.

FIG. 5 illustrates an example scenario, in which, an object storage change stream is captured and delivered to consumers in a distributed storage system, according to an example of the present disclosure.

The DB service module 104 may provide a variety of API interfaces for interacting with objects and collections. For instance, API interfaces related to the object may include PutObjects API, GetObjects API, DeleteObjects API, ListObjects API, etc. API interfaces related to the collection may include CreateCollection API, DescribeCollection API, AlterCollection API, DropCollection API, etc. As illustrated in the example scenario 500, the application platform 110 may call the PutObjects API, requesting to write an object to the collection. Upon receiving the request, the DB service module 104 may obtain the collection definition (e.g., collection ID) based on the collection table 116. The DB service module 104 may further compute an object hash for partition assignment using a hash function and determine an object storage pod to write to. The DB service module 104 may then put the object into the object table 114 using the object hash as the ID. Once the object writing is successful, the DB service module 104 may put listing record for the mapping of the object hash and the associated key in the listing table 118. Referring to FIG. 4, the operation of putting the object in the collection may assign a partition in the collection hash ring (e.g., collection hash ring 402) to the object, which points to a partition indicative of the object storage pod and the index storage pod information.

As discussed herein, putting the object in the collection causes changes to the object storage, which may automatically generate a change data capture (CDC) record. The CDC record may be sent to the DB search service module 108 to update the index storage accordingly. In some examples, the CDC record may include a pre-image of the object storage before the change. In some other examples, the CDC record may include a post-image of the object storage after the change. In yet other examples, the CDC record may include an image difference between the pre-image and the post-image of the object storage. In yet other examples, the CDC record may include the primary key that is changed. In yet other examples, the CDC record may include a combination of the pre-image and the post-image.

In some examples, the CDC record may be streamed through a streaming service module 106. The streaming service module 106 may be implemented by a streaming system such as Apache Kafka, Apache Pulsar, and/or a queueing system such as Amazon SQS, etc. In some examples, the streaming service module 106 may further include storage clusters to stream the CDC records to the consumers in the downstream. The DB search service module 108, as an example of consumers, upon receiving the CDC record, may update the index table 124 in the index storage 112. Alternatively or additionally, the CDC record may also be streamed to a wrangler service module 502 to update a global state DB 504 of the distributed storage system. In some examples, the streaming service module 106 may be extended to services other than the wrangler service module 502. For instance, any new extensions (e.g., new service modules) may subscribe to the streaming service module 106 to use the subscribing/publishing functions provided by the streaming service platform.

It should be understood that the operation of putting an object is used as an example of object storage change in in the example scenario 500. The present disclosure is not intended to be limiting. Other operations such as getting objects, deleting objects, listing objects, creating collections, describing collections, altering collections, dropping collections, etc., may also generate the CDC records. In implementations, multiple Apps on the application platform 110 may send multiple requests to interact with the object storage. The DB service module 104 may lock the collection that the interaction is targeted at and release the collection until the interaction is completed (e.g., object putting successfully). In some examples, the DB service module 104 may also batch process the interactions with the object storage, e.g., putting multiple objects to the object storage 102.

Figure 6:
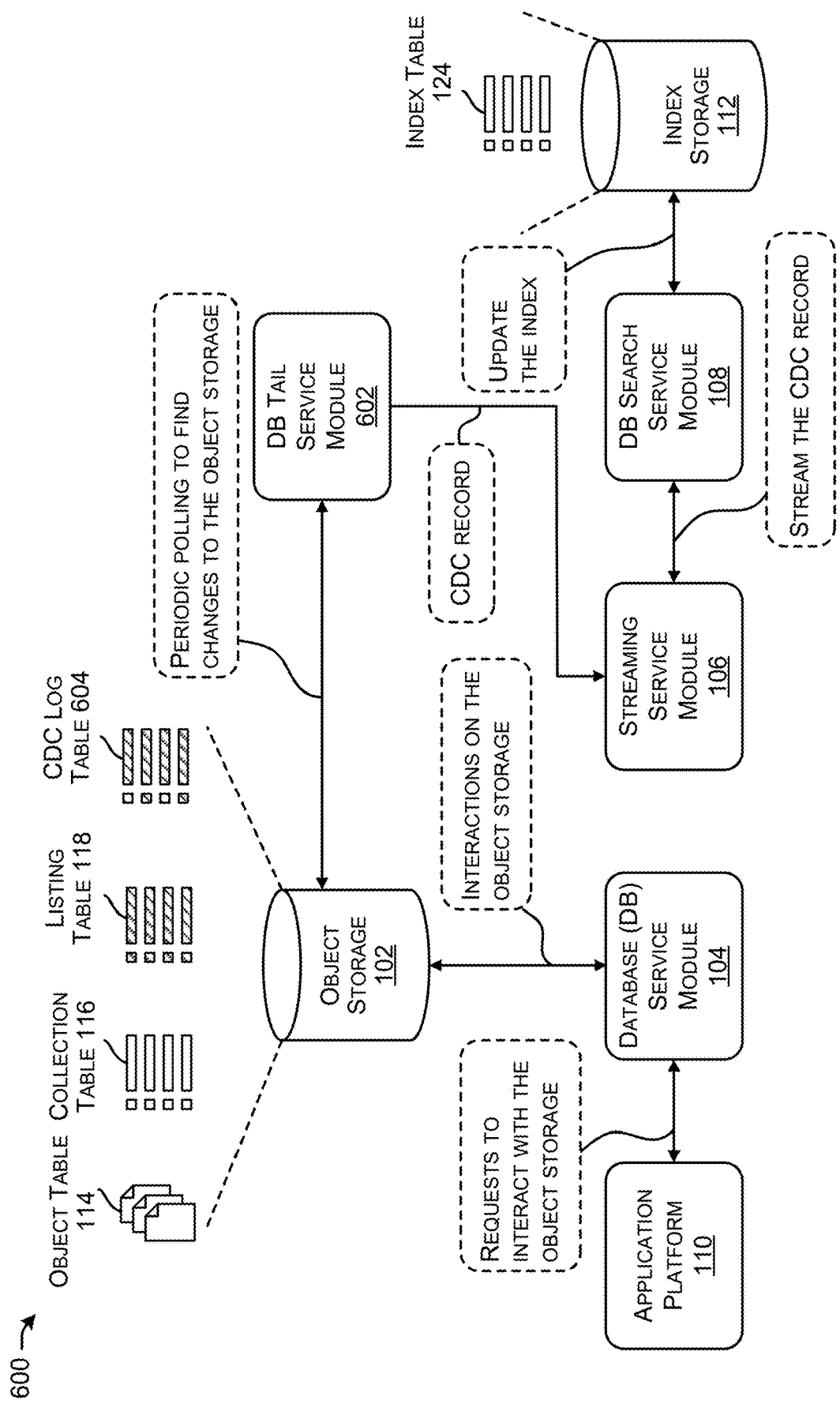
FIG. 6 illustrates another example scenario, in which, an object storage change stream is captured and delivered to consumers in a distributed storage system, according to an example of the present disclosure.

FIG. 6 illustrates another example scenario, in which, an object storage change stream is captured and delivered to consumers in a distributed storage system, according to an example of the present disclosure.

As illustrated in FIG. 6, requests to interact with the object storage 102 such as putting/deleting objects, getting/listing objects, etc., may be constantly received from the application platform 110. Interactions with the object storage 102 may be performed by the DB service module 104 based on the requests. A DB tail service module 602 may query the object storage 102 on a periodic polling frequency and look for records that have changed since the last polling period. The DB tail service module 602 may identify the newly added records (e.g., objects, collections, schema, etc.) and newly altered records by comparing the timestamps with the last polling timestamp. In some examples, deleted records may be marked as deleted and/or to be deleted in the object storage 102. In some examples, the DB tail service module 602 may periodically scan across all partitions of a cluster to look for changes. Alternatively or additionally, for NoSQL based database, the DB tail service module 602 may periodically scan the base tables where different Apps reads and writes are happening for changes (e.g., object table 114, collection table 116, listing table 118, etc.) to identify the changes to the object storage 102.

In some examples, rather than polling the base tables, the DB tail service module 602 may leverage a separate CDC log table 604 that acts as a change log for those base tables (e.g., object table 114, collection table 116, listing table 118, etc.). The CDC log table 604 may include records of every modification that occurred against those base tables. In implementations, a retention rule and/or a time-to-live (TTL)-based expiration rule may be set for the items in the CDC log table 604. The DB tail service module 602 may send the newly discovered CDC record since last polling period to the streaming service module 106. The downstream service such as the DB search service module 108 may receive the CDC record and update the index table 124 in the index storage 112 accordingly. Although not shown, the CDC record may also be streamed to other downstream service (e.g., the wrangler service module 502 shown in FIG. 5) to update the global state DB 504 of the distributed storage system.

Figure 7:
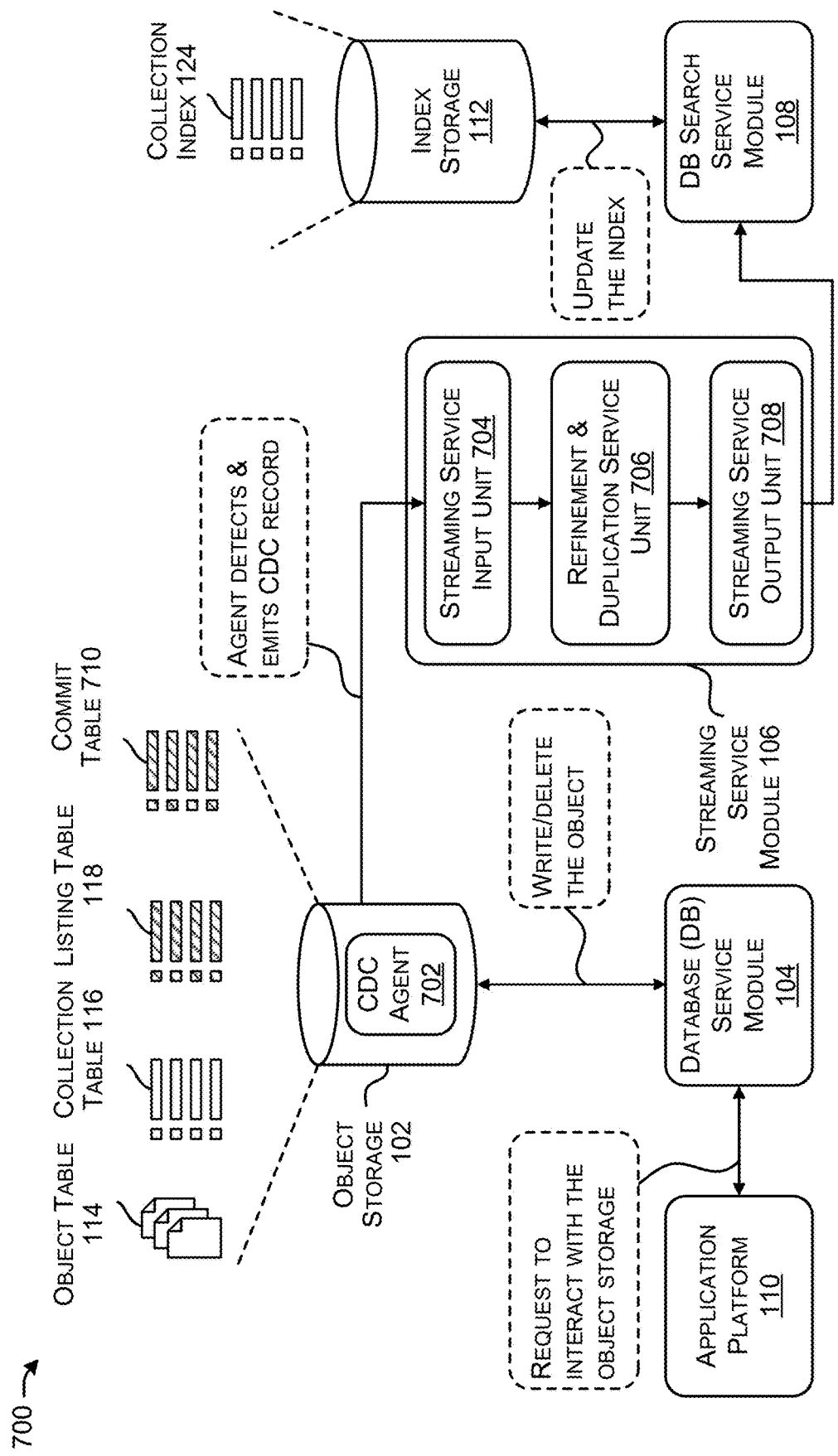
FIG. 7 illustrates another example scenario, in which, an object storage change stream is captured and delivered to consumers in a distributed storage system, according to an example of the present disclosure.

FIG. 7 illustrates another example scenario, in which, an object storage change stream is captured and delivered to consumers in a distributed storage system, according to an example of the present disclosure.

As shown in the example scenario 700, a change data capture (CDC) agent 702 may be implemented by the object storage 102 to detect the emit the captured CDC records. In some examples, the CDC agent 702 may be a Java-based agent that runs locally with each node or cluster in the object storage 102. The CDC agent 702 may capture the changes by inspecting an internal commit log 710 and/or an external commit log (e.g., Apache Kafka) and publish the captured CDC records as a topic to the streaming service module 106 (e.g., Apache Pulsar Topic). As shown, a streaming service input unit 704 of the streaming service module 106 may receive the CDC records published by the CDC agent 702 and pass the topic related to the CDC records to a refinement and duplication service unit 706 of the streaming service module 106. The refinement and duplication service unit 706 may further duplicate the topic and ensure the associated CDC records are current. The refinement and duplication service unit 706 may further publish the CDC records to another topic through a streaming service output unit 708 to a downstream consumer such as the DB search service module 108.

Figure 8:
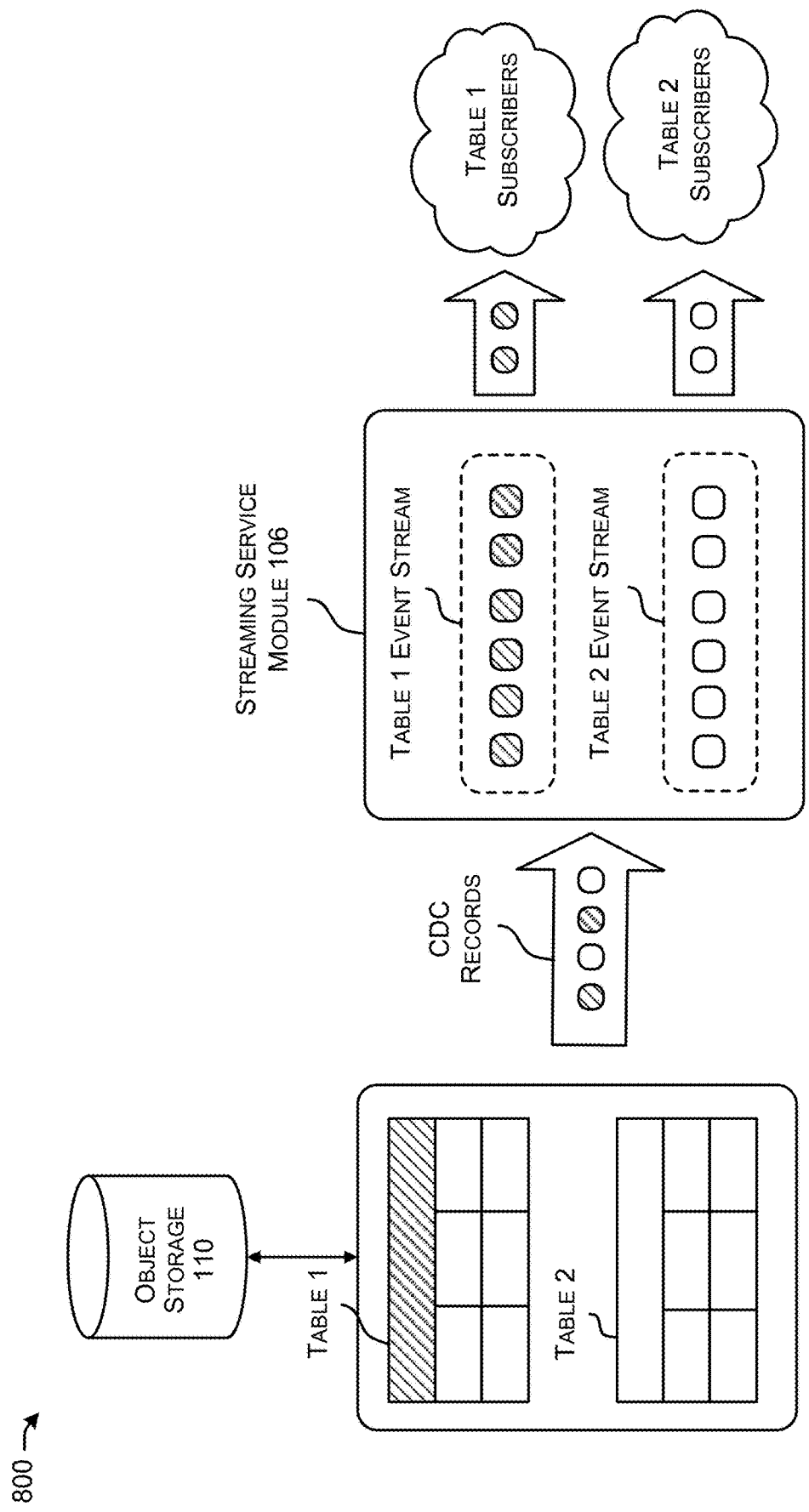
FIG. 8 illustrates an example streaming scenario, in which, an object storage change stream is captured and delivered to consumers in a distributed storage system, according to an example of the present disclosure.

FIG. 8 illustrates an example streaming scenario, in which, an object storage change stream is captured and delivered to consumers in a distributed storage system, according to an example of the present disclosure. The example streaming scenario 800 may be applicable to one or more of the example scenarios shown in FIG. 2 and FIGS. 5-7.

As illustrated, the CDC records may be generated based on changes made to every table in the object storage 102. In some examples, every change in a table may correspond to a single CDC record streamed to the streaming service module 106. The streaming service module 106 may further sort the streamed CDC record according to the tables where the CDC records are emitted. For instance, a Table 1 event stream may be constructed for all CDC records associated with Table 1 in the object storage 102, and a Table 2 event stream may be constructed for all CDC records associated with Table 2 in the object storage 102, etc. The event stream may be further pushed to the corresponding subscribers. For example, the Table 1 event stream may be further pushed to Table 1 subscribers, and the Table 2 event stream may be further pushed to Table 2 subscribers.

Figure 9:
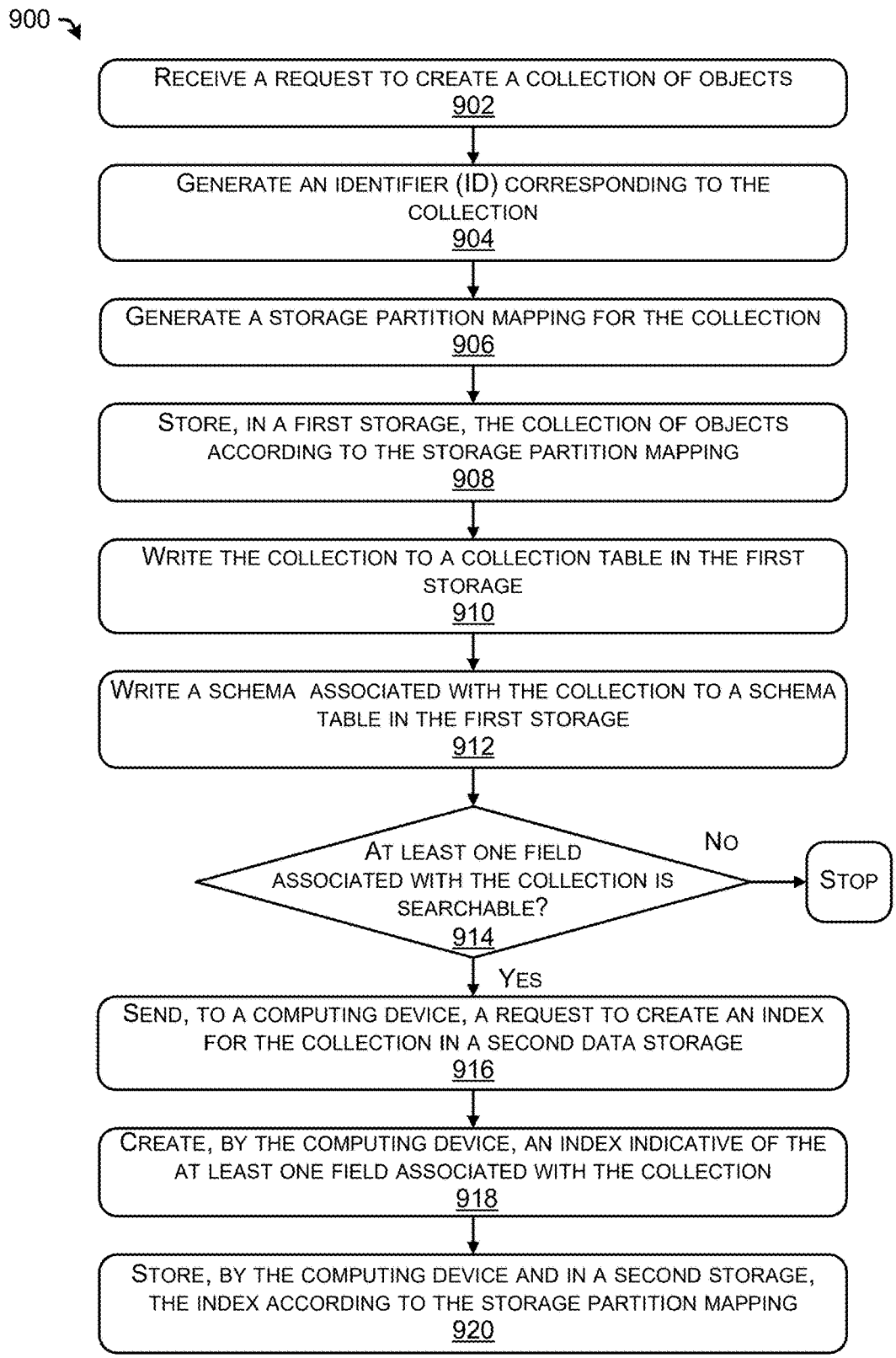
FIG. 9 illustrates an example process for creating a collection of objects in a distributed storage system, according to an example of the present disclosure.

FIG. 9 illustrates an example process for creating a collection of objects in a distributed storage system, according to an example of the present disclosure. The operations following the example process 900 may be performed by a database service module such as the DB service module 104, as shown in FIGS. 1-3 and 5-8.

At operation 902, the process may include receiving a request to create a collection of objects. The request may be initiated by an application on an application platform and include information that identifies the application such as, an application identifier, a content identifier, a namespace, etc. The request may further include information related to the objects in the collection such as the objects and their corresponding keys. In some instances, the request may further include a schema associated with the collection. The schema may specify one or more fields associated with the collection of objects that are searchable and/or indexable. In implementations, the application on the application platform may call a CreateCollection API to a database service (e.g., the DB service module 104).

At operation 904, the process may include generating an identifier (ID) corresponding to the collection. The database service (e.g., the DB service module 104) may execute a function such as generate-id ( ) function to obtain a string value that uniquely identifies the collection of objects. In some examples, to have the ability to independently scale key-value storage and search storage and processing, a schema may be required to be specified for a collection of objects. Thus, when a schema is not specified for the collection, the database service may reject the request to create the collection.

At operation 906, the process may include generating a storage partition mapping for the collection. As discussed herein, the DB service may generate a mapping between the objects in the collection and their respective storage pods. In some instances, the mapping may be constructed as a collection hash ring, as illustrated in FIG. 4. The DB service may execute a hash function to compute a partition assignment for an object and determine the storage pod the object is written to. The hash value associated with an object partition may be computed based on the collection ID and the key associated with the object.

As discussed herein, in circumstances when no schema is specified for the collection of objects, the process may reject the request to create a collection. In circumstances when there is a schema specified for the collection of objects, the process may concurrently perform operations to create the collection of objects and perform operations to create an index for the collection of objects, if there is at least one field is searchable as described in the schema.

To create the collection of objects, the process may include operation 908, operation 910, and operation 912.

At operation 908, the process may include storing, in a first storage, the collection of objects according to the storage partition mapping. As discussed herein, for each object in the collection, a storage pod in the first storage (e.g., a cluster, a node, etc.) may be determined based on a hash computation of the collection ID and the key associated with the object. The DB service may storage the details of the object (e.g., key-value pairs) in the storage pod according to the storage partition mapping. The DB service may further insert the object into an object table associated with the first storage to include information that identifies the object as well as the storage pod where the object is stored, such as an IP address of the storage pod, etc.

At operation 910, the process may include writing the collection to a collection table in the first storage. When all objects in the collection are written to the object table, the DB service may further insert the collection to a collection table to include information that identifies the collection such as a namespace of the collection, a collection ID, IP addresses of the storage pods where the objects in the collection are stored, a range of the IP addresses of the storage pods where the objects in the collection are stored, etc.

At operation 912, the process may include writing a schema associated with the collection to a schema table in the first storage. As discussed herein, a schema may be specified for the collection. Thus, the schema associated with the collection may be inserted to a schema table in the first storage. A type of the schema and a version of the schema may also be inserted into the schema table.

At operation 914, the process may include determining whether at least one field associated with the collection is searchable. As discussed herein, the schema associated with the collection may define the fields that are searchable.

When there is no field associated with the collection is searchable, the process may stop without creating an index in the index storage.

When at least one field associated with the collection is searchable, to create an index for the collection, the process may include operation 916, operation 918, and operation 920.

At operation 916, the process may include sending, to a computing device, a request to create an index for the collection in a second data storage. In some examples, the DB service (e.g., DB service module 104 in FIG. 1) may connect to a DB search service (e.g., DB search service module 108 in FIG. 1). The request may include information that the DB search service requires to create an index mapping in the second storage such as a collection ID, a version of the schema, one or more indexable fields or searchable fields in flattened names and types, etc. In some examples, the DB service may contact the DB search service directly via a Remote Procedure Call (gRPC)-based connection to request creation of the index.

At operation 918, the process may include creating, by the computing device, an index indicative of the at least one field associated with the collection. As discussed herein, upon receiving the request from the DB service, the DB search service may generate an index item corresponding to the collection to include the associated collection data (e.g., collection ID, schema version, indexable fields, etc.). In some examples, the DB search service may be implemented by a computing device, where the search service is configured to be open to customers associated with the application platform.

At operation 920, the process may include storing, by the computing device and in a second storage, the index according to the storage partition mapping. As discussed herein, the DB service may further insert the index item corresponding to the collection to an index table in the second storage. In some examples, when a storage partition mapping is created for the collection, the DB service may also determine an index storage pod to write the index to. The DB search service may then store the index corresponding to the collection according to the storage partition mapping.

Figure 10:
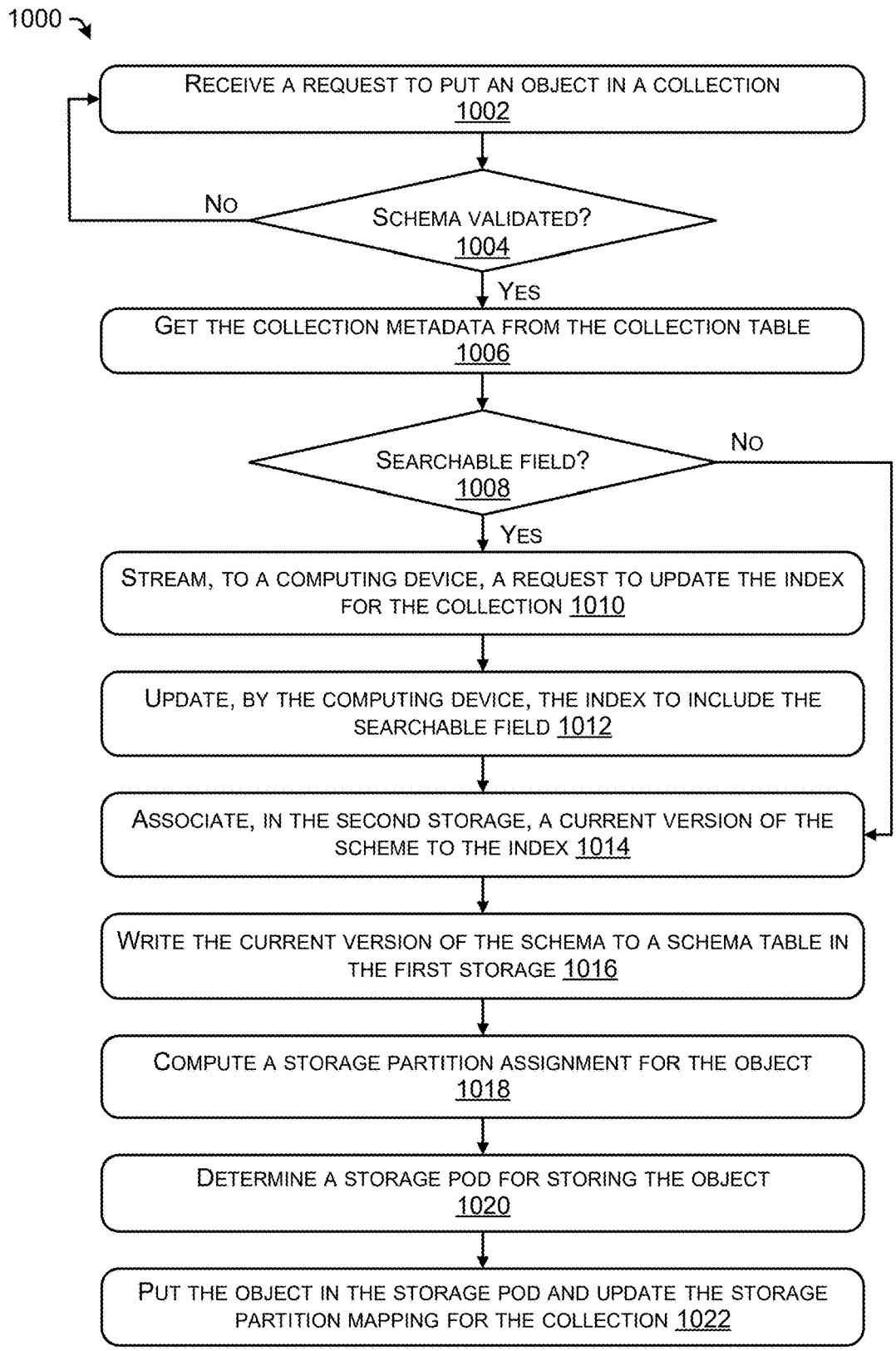
FIG. 10 illustrates an example process for putting an object in a collection in a distributed storage system, according to an example of the present disclosure.

FIG. 10 illustrates an example process for putting an object in a collection in a distributed storage system, according to an example of the present disclosure. The operations following the example process 1000 may be performed by a database service module such as the DB service module 104, as shown in FIGS. 1-3 and 5-8.

At operation 1002, the process may include receiving a request to put an object in a collection. As discussed herein, after a collection is created in a database, the user may send a request to put a new object to the collection. The request may include data associated with the new object and data identifying the collection to put to. For example, the request may include a namespace, an application ID, a collection ID, etc.

At operation 1004, the process may include determining whether an associated schema is validated. In some examples, the schema used by the DB service is written in JSON schema. The DB service (e.g., the DB service module 104) may confirm whether the new object is a valid object according to the schema associated with the collection. Additionally, the DB service may extract the indexable fields from the schema and validate whether the items marked as "indexable" in the schema are supported index categories. For example, an array type fields may not be indexable. In another example, an array that contains multiple different data types may not be indexable.

When the associated schema is not validated, the process may reject the request and return to operation 1002.

When the associated schema is validated, at operation 1006, the process may include getting the collection metadata from a collection table. The DB service may get the collection metadata from the collection table based on the collection ID and/or the application ID provided in the request. As discussed herein, the collection may be stored in the first storage separate from the second storage where the indexes are stored.

At operation 1008, the process may include determining whether there is a searchable field defined in the schema. As discussed herein, the DB service may extract the items that are marked as "indexable" in the schema and validate whether these items are actually indexable (e.g., supported indexable types).

When there is a searchable field defined in the schema (e.g., supported indexable types), at operation 1010, the process may include streaming, to a computing device, a request to update the index for the collection. The request to update the index for the collection may be sent through a streaming service (e.g., streaming service module 106 in FIG. 1). The streaming service may be implemented by a distributed event store and stream-processing platform such as Apache Kafka.

At operation 1012, the process may include updating, by the computing device, the index to include the searchable field. The computing device (e.g., the DB search service module 108), upon receiving the streamed request, may update the index table to associate the newly defined searchable field with the collection.

At operation 1014, the process may include associating, in the second storage, a current version of the schema to the index. In some examples, the schema may specify the current version. In some other examples, the DB search service may determine the current version by checking a timestamp associated with the schema. The DB search service may associate the current version to the index corresponding to the collection. As discussed herein, all versions of the schema associated with a same collection stored in the first storage (e.g., the object storage) may be linked together and point to the same index in the second storage (e.g., the index storage).

In some instances, when there is no new searchable field defined in the schema, the process may go directly to operation 1014 to associate the current version of the schema with the index.

In the meantime, the process may include the operations to update the collection and associated schema stored in the first storage (e.g., the object storage). For example, the process may include writing the current version of the schema to a schema table in the first storage at operation 1016, computing a storage partition assignment for the object at operation 1018, determining a storage pod for storing the object at operation 1020, putting the object in the storage pod and updating the storage partition mapping for the collection at operation 1022. Similar to the operation 908 as shown in FIG. 9, the DB service may implement a consistent hash approach to compute a subsequent hash value pointing to a partition assigned for the new object in the storage partition mapping and determine a storage pod for storing the new object. The DB service may then put the new object in the storage pad according to the partition assignment.

Figure 11:
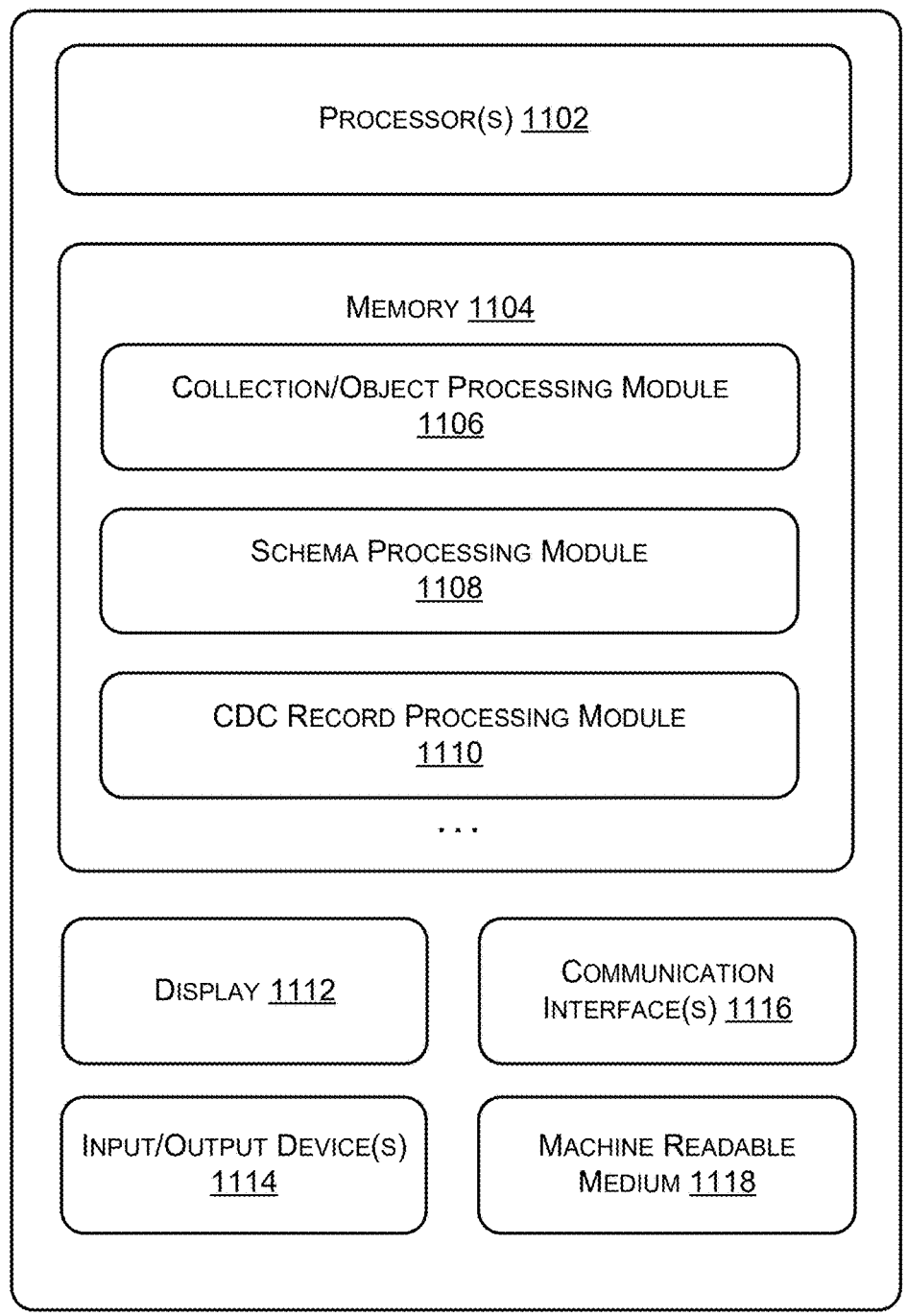
FIG. 11 illustrates an example computer device that implements techniques for scalable key value storage in a distributed storage system, according to the present disclosure.

FIG. 11 illustrates an example computer device that implements techniques for scalable key value storage in a distributed storage system, according to the present disclosure. The example computer device 1100 may be performed by a database service module such as the DB service module 104, as shown in FIGS. 1-3 and 5-8.

As illustrated in FIG. 11, the computer device 1100 may comprise processor(s) 1102, a memory 1104 storing a collection/object processing module 1106, a schema processing module 1108, and a CDC record processing module 1110, a display 1112, input/output device(s) 1114, communication interface(s) 1116, and/or a machine readable medium 1118.

In various examples, the processor(s) 1102 can be a central processing unit (CPU), a graphics processing unit (GPU), or both CPU and GPU, or any other type of processing unit. Each of the one or more processor(s) 1102 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 1102 may also be responsible for executing all computer applications stored in memory 1104, which can be associated with common types of volatile (RAM) and/or nonvolatile (ROM) memory.

In various examples, the memory 1104 can include system memory, which may be volatile (such as RAM), nonvolatile (such as ROM, flash memory, etc.) or some combination of the two. The memory 1104 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computer device 1100. Any such non-transitory computer-readable media may be part of the computer device 1100.

The collection/object processing module 1106 may be configured to perform operations with respect to any new and/or existing collections/objects stored in the object storage. For instance, the collection/object processing module 1106 may perform operations including but are not limited to, creating a new collection in the object storage, putting a new object in an existing collection, reading an object from the object storage, modifying details of an object, deleting an object and/or a collection from the object storage, searching objects and/or collections based on keys, etc. The collection/object processing module 1106 may communicate with the object storage via the communication interface(s) 1116 to perform the operations on the collections/objects.

The schema processing module 1108 may be configured to perform operations with respect to any new and/or existing schemas stored in the object storage. For instance, the schema processing module 1106 may perform operations including but are not limited to, parsing and validating a schema, identifying searchable/indexable fields from the schema, writing a new schema and/or a new version of a schema to the object storage, etc. The schema processing module 1108 may communicate with the object storage via the communication interface(s) 1116 to perform the operations on the collections/objects.

The CDC record processing module 1110 may be configured to monitor any changes made to the object storage and generate a captured data change (CDC) record. In some examples, the CDC record process module 1110 may automatically generate the CDC record when the collection/object processing module 1106 and/or the schema processing module 1106 performs an operation on the object storage. The CDC record processing module 1110 may also communicate with the object storage via the communication interface(s) 1116 to monitor the changes made to the object storage. In some examples, the CDC record processing module 1110 may send the CDC record to a streaming service platform through the communication interface(s) 1116.

As discussed herein, the CDC record processing module 1110 may be implemented by the database service module such as the DB service module 104, as shown in FIGS. 1-3 and 5-8. However, in some examples, the CDC record processing module 1110 may be implemented by another computing device such as, the wrangler service module 502 as shown in FIG. 5 or the DB tail service module 602 as shown in FIG. 6. In yet other examples, the CDC record processing module 1110 may be implemented by the object storage itself such as the CDC agent 702 as shown in FIG. 7.

The communication interface(s) 1116 can include transceivers, modems, interfaces, antennas, and/or other components that perform or assist in communicating with other computing devices, servers, storages associated with various computer platforms including but are not limited to, application platform (e.g., the application platform 110), streaming service platform (e.g., the streaming service module 106), DB search service (e.g., the DB search service module 108), the object storage 102, the index storage 112, the wrangler service module 502, the DB tail service module 602, etc.

Display 1112 can be a liquid crystal display or any other type of display commonly used in the computer device 1100. For example, display 1112 may be a touch-sensitive display screen and can then also act as an input device or keypad, such as for providing a soft-key keyboard, navigation buttons, or any other type of input. Input/output device(s) 1114 can include any sort of output devices known in the art, such as display 1112, speakers, a vibrating mechanism, and/or a tactile feedback mechanism. Input/output device(s) 1114 can also include ports for one or more peripheral devices, such as headphones, peripheral speakers, and/or a peripheral display. Input/output device(s) 1114 can include any sort of input devices known in the art. For example, input/output device(s) 1114 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 1118 can store one or more sets of instructions, such as software or firmware, which embodies any one or more of the methodologies or functions described herein. The instructions can also reside, completely or at least partially, within the memory 1104, processor(s) 1102, and/or communication interface(s) 1116 during execution thereof by the computer device 1100. The memory 1104 and the processor(s) 1102 also can constitute machine readable media 1118.

The various techniques described herein may be implemented in the context of computer-executable instructions or software, such as program modules, which are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in unusual ways, depending on circumstances.

Similarly, software may be stored and distributed in numerous ways and using different means, and the particular software storage and execution configurations described above may be varied in many different ways. Thus, software implementing the techniques described above may be distributed on various types of computer-readable media, are not limited to the forms of memory that are specifically described.

Conclusion

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at various times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method comprising:
receiving, by a processor, a request to create a collection of data objects in a first database, the request including a digital file defining an attribute associated with the collection of data objects;
generating, by the processor, an identifier (ID) corresponding to the collection of data objects;
creating, by the processor and according to the digital file and the ID, the collection of data objects in the first database;
determining, by the processor, the digital file indicating a searchable field associated with the collection of data objects, by which, the collection of data objects is searchable, wherein the searchable field includes a key associated with a data object in the collection of the data objects and a value corresponding to the key; and
based on the digital file indicating the searchable field associated with the collection of data objects, sending, an instruction to a computing device, the instruction causing the computing device to:
create an index corresponding to the collection of data objects in a second database, wherein the index is indicative of the searchable field,
generate, based on the key and the ID and using a hash function, a first hash value, and
associate the first hash value with a data entry in the second database, wherein the data entry indicates:
a first storage space in the first database, the first storage space storing the data object, and
a second storage space in the second database, the second storage space storing the index.

2. The computer-implemented method of claim 1, further comprising:
creating, by the processor, an entry corresponding to the digital file in a digital table in the first database; and
storing, by the processor, metadata associated with the digital file in the first database,
wherein the entry includes at least one of the ID corresponding to the collection of data objects, a version of the digital file, a type of the digital file, or the searchable field.

3. The computer-implemented method of claim 1, wherein receipt of the instruction on the computing device further causes the computing device to:
store the ID corresponding to the collection of data objects and a version of the digital file in the second database; and
associate the index with the ID corresponding to the collection of data objects and the version of the digital file.

4. The computer-implemented method of claim 1, further comprising:
receiving, by the processor, a request to add a new data object to the collection of data objects, the request including a second digital file;
determining, by the processor, that the second digital file matches the digital file stored in the first database;
adding, by the processor, the new data object to the collection of data objects; and
sending, by the processor, an event to a computer streaming system, the event, when consumed by the computing device, causes the computing device to update, based on the event, the index corresponding to the collection of data objects stored in the second database.

5. The computer-implemented method of claim 4, wherein
determining, by the processor, that the second digital file is associated with a second version; and
associating, by the processor, the second version with the digital file stored in the first database,
wherein the event, when consumed by the computing device, causes the computing device to associate the second version with the ID corresponding to the collection of data objects stored in the first database.

6. The computer-implemented method of claim 4, wherein
the event indicates an additional searchable field associated with the collection of data objects defined by the second digital file, and
the event, when consumed by the computing device, causes the computing device to:

associate the additional searchable field with the index corresponding to the collection of data objects stored in the second database; and associate the additional searchable field with the ID corresponding to the collection of data objects.

7. The computer-implemented method of claim 1, further comprising:

receiving, by the processor, a search request, the search request including a search field;

calling, by the processor, a Remote Procedure Call API on the computing device, causing the computing device to:
compare the search field with the indexes stored in the second database; and
identify at least one index that matches the search field;

receiving, from the computing device, the at least one index; and identifying, by the processor, one or more data objects in the first database, the one or more data objects being associated with the at least one index.

8. A computer system comprising:

a processor, a network interface, and a memory storing instructions executed by the processor to perform actions including:

receiving a request to create a collection of data objects in a first database, the request including a digital file associated with the collection of data objects;

generating an identifier (ID) corresponding to the collection of the data objects;

creating, according to the digital file and the ID, the collection of data objects in the first database;

determining the digital file indicating a searchable field associated with the collection of data objects, by which, the collection of data objects is searchable, wherein the searchable field includes a key associated with a data object in the collection of the data objects and a value corresponding to the key; and based on the digital file indicating the searchable field associated with the collection of data objects, calling an application program interface (API) on a computing device, the calling of the API causing the computing device to:
create an index corresponding to the collection of data objects in a second database, wherein the index is indicative of the searchable field,
generate, based on the key and the ID and using a hash function, a first hash value, and
associate the first hash value with a data entry in the second database, wherein the data entry indicates:
a first storage space in the first database, the first storage space storing the data object, and
a second storage space in the second database, the second storage space storing the index.

9. The computer system of claim 8, wherein the instructions are executed by the processor to perform actions including:

creating, by the processor, an entry corresponding to the digital file in a digital table in the first database; and storing, by the processor, metadata associated with the digital file in the first database, wherein the entry includes at least one of the ID corresponding to the collection of data objects, a version of the digital file, a type of the digital file, or the searchable field.

10. The computer system of claim 8, wherein receipt of the calling of the API on the computing device further causes the computing device to:

store the ID corresponding to the collection of data objects and a version of the digital file in the second database; and associate the index with the ID corresponding to the collection of data objects and the version of the digital file.

11. The computer system of claim 8, wherein the instructions are executed by the processor to perform actions including:

receiving, by the processor, a request to add a new data object to the collection of data objects, the request including a second digital file;

determining, by the processor, that the second digital file matches the digital file stored in the first database;

adding, by the processor, the new data object to the collection of data objects; and sending, by the processor, an event to a computer streaming system, the event, when consumed by the computing device, causes the computing device to update, based on the event, the index corresponding to the collection of data objects stored in the second database.

12. The computer system of claim 11, wherein the instructions are executed by the processor to perform actions including:

determining that the second digital file is associated with a second version; and associating the second version with the digital file stored in the first database, wherein the event, when consumed by the computing device, causes the computing device to:
associate the second version with the ID corresponding to the collection of data objects stored in the first database.

13. The computer system of claim 11, wherein the event indicates an additional searchable field associated with the collection of data objects defined by the second digital file, and the event, when consumed by the computing device, causes the computing device to:
associate the additional searchable field with the index corresponding to the collection of data objects stored in the second database; and
associate the additional searchable field with the ID corresponding to the collection of data objects.

14. A computer-readable non-transitory storage medium storing computer-readable instructions, that when executed by a processor, cause the processor to perform operations including:

receiving a request to create a collection of data objects in a first database, the request including a digital file defining an attribute associated with the collection of data objects;

generating an identifier (ID) corresponding to the collection of the data objects;

creating, according to the digital file and the ID, the collection of data objects in the first database;

determining the digital file indicating a searchable field associated with the collection of data objects, by which, the collection of data objects is searchable, wherein the searchable field includes a key associated with a data object in the collection of the data objects and a value corresponding to the key; and based on the digital file indicating the searchable field associated with the collection of data objects, calling an application program interface (API) on a computing device, the calling of the API causing the computing device to:

create an index corresponding to the collection of data objects in a second database, wherein the index is indicative of the searchable field, generate, based on the key and the ID and using a hash function, a first hash value, and associate the first hash value with a data entry in the second database, wherein the data entry indicates:

a first storage space in the first database, the first storage space storing the data object, and a second storage space in the second database, the second storage space storing the index.

15. The computer-readable non-transitory storage medium of claim 14, wherein the instructions, when executed by a processor, cause the processor to perform operations including:

creating, by the processor, an entry corresponding to the digital file in a digital table in the first database; and storing, by the processor, metadata associated with the digital file in the first database, wherein the entry includes at least one of the ID corresponding to the collection of data objects, a version of the digital file, a type of the digital file, or the searchable field.

16. The computer-readable non-transitory storage medium of claim 14, wherein receipt of the calling of the API on the computing device further causes the computing device to:

store the ID corresponding to the collection of data objects and a version of the digital file in the second database; and associate the index with the ID corresponding to the collection of data objects and the version of the digital file.

17. The computer-readable non-transitory storage medium of claim 14, wherein the instructions, when executed by a processor, cause the processor to perform operations including:

receiving, by the processor, a request to add a new data object to the collection of data objects, the request including a second digital file;

determining, by the processor, that the second digital file matches the digital file stored in the first database;

adding, by the processor, the new data object to the collection of data objects; and sending, by the processor, an event to a computer streaming system, the event, when consumed by the computing device, causes the computing device to update, based on the event, the index corresponding to the collection of data objects stored in the second database.

* * * * *